(12) United States Patent
Lopez et al.

(10) Patent No.: US 11,528,899 B2
(45) Date of Patent: Dec. 20, 2022

(54) FISHING PLATFORM

(71) Applicants: Andy Lopez, Wahiawa, HI (US); Edwardo Rene Lopez, Wahiawa, HI (US)

(72) Inventors: Andy Lopez, Wahiawa, HI (US); Edwardo Rene Lopez, Wahiawa, HI (US)

( * ) Notice: Subject to any disclaimer, the term of this patent is extended or adjusted under 35 U.S.C. 154(b) by 0 days.

(21) Appl. No.: 17/214,610

(22) Filed: Mar. 26, 2021

(65) Prior Publication Data
US 2022/0304295 A1    Sep. 29, 2022

(51) Int. Cl.
*A01K 97/22*    (2006.01)
*A01K 97/10*    (2006.01)

(52) U.S. Cl.
CPC .............. *A01K 97/22* (2013.01); *A01K 97/10* (2013.01)

(58) Field of Classification Search
CPC ................................. A01K 97/10; A01K 97/22
USPC ................................................................. 43/4
See application file for complete search history.

(56) References Cited

U.S. PATENT DOCUMENTS

| | | | | |
|---|---|---|---|---|
| 3,289,787 A * | 12/1966 | Mcswain | ............... | E04H 15/008 182/20 |
| 3,967,694 A * | 7/1976 | Woolfolk, Sr. | ......... | A01K 97/22 182/115 |
| 4,388,774 A * | 6/1983 | Thoemke | ............... | A01K 97/10 43/42.74 |
| 5,127,181 A * | 7/1992 | Teixeira | ................. | A01K 97/10 297/188.2 |
| 5,375,905 A * | 12/1994 | Flitter | ..................... | A01K 97/22 42/94 |
| 5,697,180 A * | 12/1997 | Morizio | .................. | F41A 23/02 42/94 |
| 6,119,812 A * | 9/2000 | Chin | ...................... | A01K 97/22 382/152 |
| 6,203,103 B1 * | 3/2001 | Presson | .................. | A01K 97/22 297/188.14 |
| 6,443,786 B2 * | 9/2002 | Woolley | ................. | B63B 34/40 114/280 |
| 7,686,134 B1 * | 3/2010 | Harris | ..................... | E06C 7/426 182/222 |
| 7,967,325 B1 * | 6/2011 | Burton | ..................... | E06C 5/04 280/47.24 |
| 7,975,425 B1 * | 7/2011 | VanBurch | .............. | A01K 79/02 43/17.1 |
| 8,297,699 B1 * | 10/2012 | Midkiff | .................. | A01K 97/22 297/217.7 |
| 9,643,696 B1 * | 5/2017 | Lockhart | ................ | A01K 97/10 |
| 10,173,756 B2 * | 1/2019 | Little | ...................... | B63B 32/70 |
| 10,407,139 B2 * | 9/2019 | Thomason | ............. | B63B 29/04 |
| 10,494,067 B1 * | 12/2019 | Womack | ............... | B63B 35/613 |
| 10,645,914 B2 * | 5/2020 | Cantu | .................... | A01K 97/10 |
| 10,645,920 B2 * | 5/2020 | Litwin | .................... | F41A 23/18 |
| 10,791,725 B2 * | 10/2020 | Castillo | ................. | A01K 97/06 |

(Continued)

*Primary Examiner* — Richard G Davis
(74) *Attorney, Agent, or Firm* — The Iwashko Law Firm, PLLC; Lev Ivan Gabriel Iwashko

(57) ABSTRACT

A fishing platform, including a main body to float on a body of water, a stabilization plate movably connected to at least a portion of the main body to prevent the main body from movement in response to the stabilization plate touching a ground surface within the body of water, and a seat assembly rotatably disposed on at least a portion of the main body to rotate in at least one of a first rotational direction and a second rotational direction.

9 Claims, 1 Drawing Sheet

(56) References Cited

U.S. PATENT DOCUMENTS

| | | | | |
|---|---|---|---|---|
| 2005/0251910 A1* | 11/2005 | Boyd | ............... | A45F 3/22 |
| | | | | 5/120 |
| 2010/0050908 A1* | 3/2010 | Moore, Jr. | ............ | A01K 97/22 |
| | | | | 108/33 |
| 2010/0078088 A1* | 4/2010 | Navarro | ............... | A45D 44/22 |
| | | | | 132/216 |
| 2010/0307550 A1* | 12/2010 | Silverberg | ............ | A01K 97/22 |
| | | | | 206/315.11 |
| 2012/0073488 A1* | 3/2012 | Temple | ............... | A01K 97/10 |
| | | | | 440/106 |
| 2014/0360090 A1* | 12/2014 | Nickolas | ............... | A01K 97/05 |
| | | | | 29/428 |
| 2015/0377549 A1* | 12/2015 | Cai | ............... | A01K 97/06 |
| | | | | 43/17.5 |

* cited by examiner

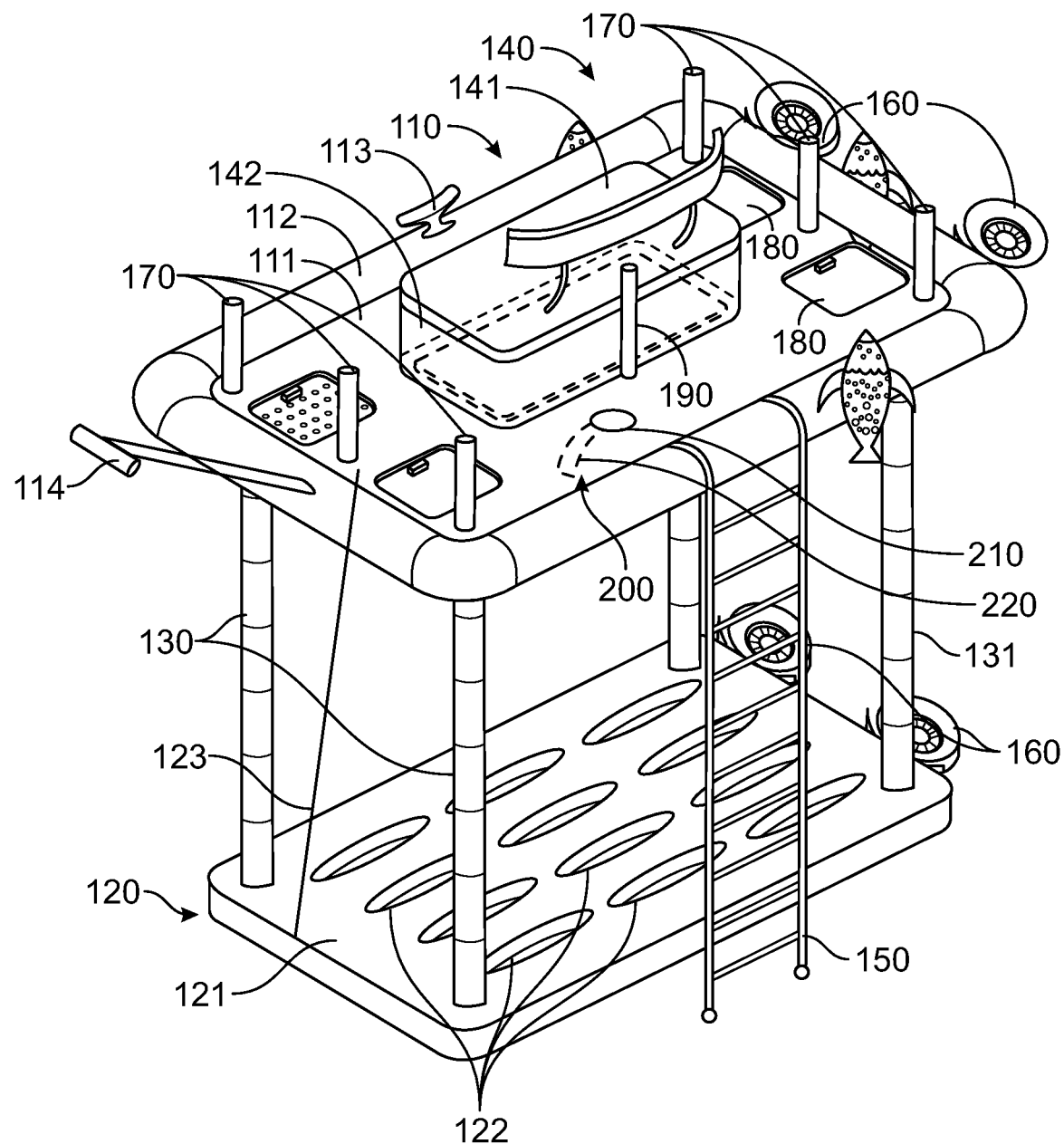

FISHING PLATFORM

BACKGROUND

1. Field

The present general inventive concept relates generally to fishing, and particularly, to a fishing platform.

2. Description of the Related Art

Wade fishing is a common hobby for people living near a large body of water. Essentially, wade fishing requires a fisherman to stand in shallow water. However, the nature of the sport is uncomfortable because the fisherman has to carry fishing supplies in the water. As such, people engaging in wade fishing must exert more effort than a fisherman who uses a boat.

Nevertheless, people who seek wade fishing prefer the feeling of moving through water and do not want to use a boat.

Therefore, there is a need for a fishing platform that allows a wade fisherman to relax while fishing, as well as, stores fishing equipment.

SUMMARY

The present general inventive concept provides a fishing platform.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a fishing platform, including a main body to float on a body of water, a stabilization plate movably connected to at least a portion of the main body to prevent the main body from movement in response to the stabilization plate touching a ground surface within the body of water, and a seat assembly rotatably disposed on at least a portion of the main body to rotate in at least one of a first rotational direction and a second rotational direction.

The stabilization plate may include a plurality of apertures to facilitate movement of the stabilization plate within the body of water.

The seat assembly may include a seat, and a cooler pivotally disposed on at least a portion of the seat to store at least one item therein.

The fishing platform may further include a plurality of telescopic poles disposed at a first end on at least a portion of the main body and at a second end on at least a portion of the stabilization plate to move from retracted in a first position to at least partially extended in a second position, and move from extended in the second position to retracted in the first position.

The fishing platform may further include a ladder telescopically disposed on at least a portion of the main body to facilitate access within the main body.

The fishing platform may further include a plurality of rod holders disposed on at least a portion of the main body to store at least one fishing rod therein.

The fishing platform may further include a plurality of storage compartments disposed on at least a portion of the main body to store at least one other item therein.

The fishing platform may further include an air dispensing unit disposed on and within at least a portion of the main body to create a cavitation bubble through a pipe into the body of water in response to depressing an air dispensing button, such that the cavitation bubble has an acoustic pressure of twelve psi.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a top isometric view of a fishing platform, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Fishing Platform 100
Main Body 110
Base 111
Wall 112
Cleat 113
Handle 114
Stabilization Plate 120
Plate Body 121
Apertures 122
Cord 123
Telescopic Poles 130
Notches 131
Seat Assembly 140
Seat 141
Cooler 142
Ladder 150
Wheels 160
Rod Holders 170
Storage Compartments 180
Umbrella Holder 190
Air Dispensing Unit 200
Air Dispensing Button 210
Pipe 220

FIG. 1 illustrates a top isometric view of a fishing platform 100, according to an exemplary embodiment of the present general inventive concept.

The fishing platform 100 may be constructed from at least one of metal, plastic, wood, glass, and rubber, etc., but is not limited thereto.

The fishing platform 100 may include a main body 110, a stabilization plate 120, a plurality of telescopic poles 130, a seat assembly 140, a ladder 150, a plurality of wheels 160, a plurality of rod holders 170, a plurality of storage compartments 180, an umbrella holder 190, and an air dispensing unit 200, but is not limited thereto.

Referring to FIG. 1, the main body 110 and/or the stabilization plate 120 are illustrated to have a rounded rectangular prism shape. However, the main body 110 and/or the stabilization plate 120 may be rectangular, circular, conical, triangular, pentagonal, hexagonal, heptagonal, octagonal, or any other shape known to one of ordinary skill in the art, but is not limited thereto.

The main body 110 may include a base 111, a wall 112, a cleat 113, and a handle 114, but is not limited thereto.

The base 111 and/or the wall 112 may be constructed as an inflatable surface. In other words, the base 111 and/or the wall 112 may float on a body of water. As such, the base 111 and/or the wall 112 may be deflated to facilitate transport thereof. Alternatively, the base 111 and/or the wall 112 may be constructed as a rigid and/or hollow structure, such that disposing the base 111 in the body of water causes displacement of the body of water equivalent to a weight of the main body 110. As such, the main body 110 may float on the body of water.

The wall 112 may be perpendicularly disposed away from the base 111 with respect to a direction. Also, the wall 112 may be disposed around at least a portion of a perimeter of the base 111. Moreover, the wall 112 may prevent water from entering a top surface of the base 111.

The cleat 113 may be disposed on at least a portion of the wall 112. The cleat 113 may receive a rope thereon. For example, the cleat 113 may receive the rope to moor the main body 110.

The handle 114 may be disposed on at least a portion of the wall 112. The handle 114 may facilitate gripping thereof. As such, the base 111 and/or the wall 112 may move in response to movement of the handle 114.

The stabilization plate 120 may include a plate body 121, a plurality of apertures 122, and a cord 123, but is not limited thereto.

The plate body 121 may have a size (e.g., length, width, height) less than and/or equivalent to the base 111. However, the plate body 121 may have a weight greater than a weight of the main body 110.

The plate body 121 may be movably connected to at least a portion of the base 111 and/or the wall 112, such that the plate body 121 and/or the base 111 may be in parallel.

The plurality of apertures 122 may be disposed on and/or within at least a portion of the plate body 121. Additionally, the plurality of apertures 122 may facilitate movement of the plate body 121 within the body of water due to less resistance, such as sinking deeper into the body of water (i.e. toward a bottom of the body of water), such as water moving through the plurality of apertures 122 in a perpendicular and/or angular direction.

The cord 123 may be disposed on at least a portion of the plate body 121. The cord 123 may facilitate gripping thereof. As such, the plate body 121 may move in response to movement of the cord 123.

Each of the plurality of telescopic poles 130 may include a plurality of notches 131, but is not limited thereto.

Each of the plurality of telescopic poles 130 may be disposed at a first end on at least a portion of a corner of the base 111 and disposed at a second end on at least a portion of a corner of the plate body 121. In other words, the plurality of telescopic poles 130 may movably (i.e. telescopically) connect the base 111 to the plate body 121. Moreover, the plurality of telescopic poles 130 may move from retracted in a first position to at least partially extended in a second position. Conversely, the plurality of telescopic poles 130 may move from extended in the second position to retracted in the first position.

Therefore, the plate body 121 may contact the base 111 while the plurality of telescopic poles 130 are in the first position and move away from (i.e. separated, not in contact with) the base 111 while the plurality of telescopic poles 130 are in the second position. Also, as previously mentioned, the plurality of apertures 122 may facilitate movement of the plate body 121 through within the body of water during sinking and/or while the plurality of telescopic poles 130 are moving from the first position to the second position. The plate body 121 may stabilize the main body 110, such that the plate body 121 may prevent the main body 110 from movement while the plate body 121 touches a ground surface within the body of water. In other words, the plate body 121 may anchor the main body 110 within the body of water.

Conversely, the plurality of telescopic plates 130 may move from the second position to the first position in response to moving (i.e. pushing and/or pulling) the cord 123 toward the base 111, such that the plate body 121 may move toward and/or contact the base 111.

Furthermore, each of the plurality of notches 131 may be disposed along a length of each of the plurality of telescopic poles 130. Moreover, the plurality of notches 131 may be disposed at equivalent distances with respect to each other.

For example, a first notch may be distanced from a second notch. The second notch may be distanced from a third notch, such that the distance between the first notch and the second notch is equivalent to the distance between the second notch and the third notch.

The plurality of notches 131 may allow the plurality of telescopic poles 130 to extend at preset distances based on each of the plurality of notches 131. In other words, extending the plurality of notches 131 to the first notch may lock the plurality of telescopic poles 130 at the first notch. However, rotating each of the plurality of telescopic poles 130 in a first direction (i.e. clockwise) or a second direction (i.e. counterclockwise) may release the lock, such that the plurality of telescopic poles 130 may move from the second position to the first position. Accordingly, the plurality of telescopic poles 130 may be rotated in second direction or the first direction opposite from the unlock to allow the plurality of telescopic poles 130 to lock at each of the plurality of notches 131 in response to moving the plurality of telescopic poles 130 from the first position to at least partially toward the second position.

The seat assembly 140 may include a seat 141 and a cooler 142, but is not limited thereto.

The seat 141 may be pivotally disposed on at least a portion of the cooler 142. Moreover, the seat 141 may receive a user thereon. Additionally, the seat 141 may pivot from closed in a first position to at least partially opened in a second position. Conversely, the seat 141 may pivot from opened in the second position to closed in the first position.

The cooler 142 may be rotatably disposed on at least a portion of the base 111. As such, the cooler 142 may rotate three hundred sixty degrees (360°) in a first rotating direction (i.e. clockwise) or a second rotating direction (i.e. counterclockwise). Therefore, the seat 141 may rotate in response to rotation of the cooler 142. Accordingly, the user may face different directions on the seat 141 to fish.

The cooler 142 may be an insulated storage unit, such that ice may be stored therein to keep contents within the cooler 142 at a cool temperature. Alternatively, the cooler 142 may be any type of refrigeration system known to one of ordinary skill in the art, which may include a condenser, a fan, a coolant/refrigerant, a coil system, etc. As such, the cooler 142 may inject cold air within the cooler 142. For example, the cooler 142 may store the fish that have been caught therein.

The ladder 150 may be movably (i.e. telescopically) disposed on at least a portion of the wall 112. Moreover, the ladder 150 may move from retracted in a first position to at least partially extended in a second position. Conversely, the ladder 150 may move from extended in the second position to retracted in the first position. The ladder 150 may facilitate access to the main body 110 while the main body 110 is disposed in the body of water.

The plurality of wheels 160 may be rotatably disposed on at least a portion of an edge of the main body 110 and/or at least a portion of an edge of the stabilization plate 120. The plurality of wheels 160 may rotate three hundred sixty degrees (360°) in a first rotating direction (i.e. clockwise) or a second rotating direction (i.e. counterclockwise). Also, the plurality of wheels 160 may facilitate movement on the ground surface. For example, the plurality of wheels 160 may facilitate transport of the main body 110 while on a ground surface (i.e. land) toward the body of water.

The plurality of rod holders 170 may be disposed on at least a portion of the base 111. Each of the plurality of rod holders 170 may store at least one fishing rod therein.

The plurality of storage compartments 180 may be disposed on at least a portion of the base 111. Each of the plurality of storage compartments 180 may store at least one item (e.g., tackle, live bait, electronics, food, beverages) therein. Moreover, each of the plurality of storage compartments 180 may be waterproof to prevent liquid (e.g., water) from entering. Optionally, each of the plurality of storage compartments 180 may include a lid to prevent access therein, such as the liquid.

The umbrella holder 190 may be disposed on at least a portion of the base 111, such as at a rear of the seat assembly 140. The umbrella holder 190 may receive at least one umbrella therein to shade the user disposed on the seat 141.

The air dispensing unit 200 may include an air dispensing button 210 and a pipe 220, but is not limited thereto.

The air dispensing unit 200 may be disposed on and/or within at least a portion of the base 111. The air dispensing unit 200 may blow air through the pipe 220 in response to depressing the air dispensing button 210. Furthermore, the air dispensing unit 200 may be specifically configured to create a cavitation bubble that generates an acoustic pressure up to twelve pounds per square inch (psi), such that the cavitation bubble moves away from the pipe 220 at a predetermined speed, such as sixty-two miles per hour (mph). The pipe 220 may connect to the air dispensing button 210 and extend out from a bottom surface of the base 111 into the body of water. Accordingly, the air dispensing unit 200 may stun and/or kill fish in response to releasing the cavitation bubble toward the fish around the pipe 220. Therefore, the air dispensing unit 200 may facilitate catching the fish.

Therefore, the fishing platform 100 may allow the user (e.g., a wade fisherman) to relax during fishing. Moreover, the fishing platform 100 may store fishing equipment within the plurality of storage compartments 180.

The present general inventive concept may include a fishing platform 100, including a main body 100 to float on a body of water, a stabilization plate 120 movably connected to at least a portion of the main body 110 to prevent the main body 110 from movement in response to the stabilization plate 120 touching a ground surface within the body of water, and a seat assembly 140 rotatably disposed on at least a portion of the main body 110 to rotate in at least one of a first rotational direction and a second rotational direction.

The stabilization plate 120 may include a plurality of apertures 121 to facilitate movement of the stabilization plate 120 within the body of water.

The seat assembly 140 may include a seat 141, and a cooler 142 pivotally disposed on at least a portion of the seat 141 to store at least one item therein.

The fishing platform 100 may further include a plurality of telescopic poles 130 disposed at a first end on at least a portion of the main body 110 and at a second end on at least a portion of the stabilization plate 120 to move from retracted in a first position to at least partially extended in a second position, and move from extended in the second position to retracted in the first position.

The fishing platform 100 may further include a ladder 150 telescopically disposed on at least a portion of the main body 110 to facilitate access within the main body 110.

The fishing platform 100 may further include a plurality of rod holders 170 disposed on at least a portion of the main body 110 to store at least one fishing rod therein.

The fishing platform 100 may further include a plurality of storage compartments 180 disposed on at least a portion of the main body 110 to store at least one other item therein.

The fishing platform 100 may further include an air dispensing unit 200 disposed on and within at least a portion of the main body 110 to create a cavitation bubble through a pipe 220 into the body of water in response to depressing an air dispensing button 210, such that the cavitation bubble has an acoustic pressure of twelve psi.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A fishing platform, comprising:
a main body configured to float on a body of water;
a stabilization plate movably connected to at least a portion of the main body to prevent the main body from movement in response to the stabilization plate touching a ground surface within the body of water, such that the stabilization plate has a weight greater than a weight of the main body; and
a seat assembly rotatably disposed on at least a portion of the main body to rotate in at least one of a first rotational direction and a second rotational direction.

2. The fishing platform of claim 1, wherein the stabilization plate comprises:
a plurality of apertures to facilitate movement of the stabilization plate within the body of water.

3. The fishing platform of claim 1, wherein the seat assembly comprises:
a seat; and
a cooler pivotally disposed on at least a portion of the seat to store at least one item therein.

4. The fishing platform of claim 1, further comprising:
a plurality of telescopic poles disposed at a first end on at least a portion of the main body and at a second end on at least a portion of the stabilization plate to move from retracted in a first position to at least partially extended in a second position, and move from extended in the second position to retracted in the first position.

5. The fishing platform of claim 1, further comprising:
a ladder telescopically disposed on at least a portion of the main body to facilitate access within the main body.

6. The fishing platform of claim 1, further comprising:
a plurality of rod holders disposed on at least a portion of the main body to store at least one fishing rod therein.

7. The fishing platform of claim 1, further comprising:
a plurality of storage compartments disposed on at least a portion of the main body to store at least one other item therein.

8. The fishing platform of claim 1, further comprising:
an air dispensing unit disposed on and within at least a portion of the main body to create a cavitation bubble through a pipe into the body of water in response to depressing an air dispensing button, such that the cavitation bubble has an acoustic pressure of twelve psi.

9. A fishing platform, comprising:
a main body configured to float on a body of water;
a stabilization plate movably connected to at least a portion of the main body to prevent the main body from movement in response to the stabilization plate touching a ground surface within the body of water, such that the stabilization plate has a size and shape equivalent to a size and shape of the main body, and has a weight greater than a weight of the main body; and
a seat assembly rotatably disposed on at least a portion of the main body to rotate in at least one of a first rotational direction and a second rotational direction.

* * * * *